(12) United States Patent
Stella

(10) Patent No.: US 10,829,188 B2
(45) Date of Patent: Nov. 10, 2020

(54) ELECTRICAL NAVAL AZIMUTH PROPULSION SYSTEM COMPRISING MAGNETIC SHIELDING MEANS TO SHIELD THE MAGNETIC FIELD GENERATED BY THE ELECTRIC MOTOR

(71) Applicant: CALZONI S.r.l., Calderara di Reno (Bologna) (IT)

(72) Inventor: Vittorio Stella, Ferrara (IT)

(73) Assignee: CALZONI S.R.L., Calderara di Reno (IT)

( * ) Notice: Subject to any disclaimer, the term of this patent is extended or adjusted under 35 U.S.C. 154(b) by 78 days.

(21) Appl. No.: 15/760,985

(22) PCT Filed: Oct. 6, 2016

(86) PCT No.: PCT/IB2016/055975
§ 371 (c)(1),
(2) Date: Mar. 16, 2018

(87) PCT Pub. No.: WO2017/064595
PCT Pub. Date: Apr. 20, 2017

(65) Prior Publication Data
US 2018/0265177 A1    Sep. 20, 2018

(30) Foreign Application Priority Data
Oct. 13, 2015    (IT) .................. 102015000061093

(51) Int. Cl.
*B63H 5/125*    (2006.01)
*B63H 5/14*    (2006.01)
(Continued)

(52) U.S. Cl.
CPC .............. *B63H 5/125* (2013.01); *B63G 13/00* (2013.01); *B63H 5/14* (2013.01); *B63H 21/17* (2013.01);
(Continued)

(58) Field of Classification Search
CPC .......... B63H 5/125; B63H 5/14; B63H 21/17; B63H 2005/1258; H02K 5/132;
(Continued)

(56) References Cited

U.S. PATENT DOCUMENTS 2,832,041 A  *  4/1958  Trachtenberg ........... B63G 9/06
                                                    114/240 R
5,128,643 A     7/1992  Newman
(Continued)

FOREIGN PATENT DOCUMENTS

JP    58167294 A  *  10/1983

OTHER PUBLICATIONS

Matsui (JP 58167294 A) English Translation (Year: 1983).*
(Continued)

*Primary Examiner* — Tulsidas C Patel
*Assistant Examiner* — Robert E Mates
(74) *Attorney, Agent, or Firm* — Shuttleworth & Ingersoll, PLC; Timothy J. Klima

(57) ABSTRACT

A naval azimuth propulsion system including an electric motor, a propeller operatively connected to the electric motor to rotate about a relative central axis, an annular nozzle positioned coaxially around the propeller, elements for supporting the motor and the propeller, these elements being connectable to the hull of a ship, first magnetic shielding means designed to shield the magnetic field generated by the electric motor during its operation.

8 Claims, 2 Drawing Sheets

(51) Int. Cl.
*B63H 21/17* (2006.01)
*H02K 11/01* (2016.01)
*B63G 13/00* (2006.01)
*H02K 5/132* (2006.01)
*H02K 7/14* (2006.01)
*H02K 11/22* (2016.01)

(52) U.S. Cl.
CPC ............... *H02K 5/132* (2013.01); *H02K 7/14* (2013.01); *H02K 11/01* (2016.01); *H02K 11/022* (2013.01); *B63H 2005/1258* (2013.01)

(58) Field of Classification Search
CPC ... H02K 11/022; H02K 11/01–11/0141; B63G 13/00
USPC .......................................................... 310/87
See application file for complete search history.

(56) References Cited

U.S. PATENT DOCUMENTS

| | | | |
|---|---|---|---|
| 7,026,738 B1* | 4/2006 | Lynch | B63H 5/10 310/114 |
| 8,584,586 B1* | 11/2013 | Pugsley | B63G 9/06 102/402 |
| 2004/0042150 A1* | 3/2004 | Swinbanks | B63G 9/06 361/144 |
| 2008/0194155 A1 | 8/2008 | Gaudin | |
| 2014/0113511 A1* | 4/2014 | van der Laan | B63H 5/125 440/6 |

OTHER PUBLICATIONS

International Search Report and Written Opinion dated Dec. 23, 2016 for counterpart PCT Application No. PCT/IB2016/055975.
Italian Search Report dated Jun. 14, 2016 for counterpart Italian Application No. IT UB20154612.

* cited by examiner

ELECTRICAL NAVAL AZIMUTH PROPULSION SYSTEM COMPRISING MAGNETIC SHIELDING MEANS TO SHIELD THE MAGNETIC FIELD GENERATED BY THE ELECTRIC MOTOR

This application is the National Phase of International Application PCT/IB2016/055975 filed Oct. 6, 2016 which designated the U.S.

This application claims priority to Italian Patent Application No. 102015000061093 filed Oct. 13, 2015, which application is incorporated by reference herein.

TECHNICAL FIELD

This invention relates to a naval azimuth propulsion system. More specifically, this invention relates to a naval azimuth propulsion system powered electrically.

BACKGROUND ART

The naval azimuth propulsion systems are propulsion units which extend outside the hull of a ship and which are able to rotate about a vertical axis in such a way as to vary the relative horizontal orientation.

In this way, that is, rotating on a plane horizontal to the direction of the thrust supplied from the propulsion system, the presence of a rudder is rendered superfluous and unnecessary.

The azimuth propulsion systems allow a greater manoeuvrability of the ship relative to a propulsion system consisting of fixed propellers and a rudder, and, in effect, their use has been from the very start conceived basically for the purpose of manoeuvring large ships in ports.

Whilst initially these propulsion systems were provided in addition to traditional fixed propellers, over time, also with the emergence of further advantages liked to their use, they completely replaced the traditional systems in many cases, finally being actively used also on long journeys.

The drive of the azimuth propulsion units is normally of the hydraulic or electric type, with motors installed either outside the hull or on board, the latter arrangement providing suitable mechanical linkages to transmit the drive to the propellers which are necessarily positioned outside the hull.

In the civilian field, the above-mentioned arrangements can often be considered equivalent to each other; however, in the military field, the choice depends, for example, on the need to limit the traceability of the of the ship in order to avoid naval minefields. Modern naval mines, known as influence mines, are manufactured in such a way as to activate by the influence of the noise caused by the passage of a ship, or by its magnetic mass, or the pressure variation caused by its passage and, then, following activation, explode.

In other words, these mines are characterised by the presence of sensors which are capable of detecting the signature of surface or underwater naval vessels and they therefore await before exploding when this signature corresponds to a predetermined target.

Amongst the types of signature there are, as mentioned, the acoustic, the magnetic and the pressure type, the latter due to the movement of water connected to the movement of a ship.

Skipping for the purposes of this description the problem of the pressure signature, in order to limit the acoustic signature, attempts have been made in the azimuth propulsion systems in the military context to prevent noisy mechanical transmissions (for example, for transmission of the motion from the motor positioned inside the hull to the propeller), finally adopting electric motors positioned outside the hull, substantially in axial alignment with the propeller.

This choice, which is now in practice mandatory, has however resulted in a worse situation with regard to the magnetic signature, due to the generation of electromagnetic fields linked to the operation of the electric motor.

To overcome this drawback, suitable screens, for example comprising a shell covering the electric motor, have been devised, which are able to limit the effects of the magnetic signature induced by the electromagnetic field of the motor.

As is known, it is possible to shield a magnetic field by using sheets or plates of ferromagnetic material with a high permeability, or electrically conductive material with a high conductivity.

Opting, for reasons of practicality, for high permeability materials (for example, iron) it is necessary to make screens with a closed shape which basically surround the electric motor at the origin of the emission of the magnetic field.

In effect, ferromagnetic materials, due to their high magnetic permeability, which is much greater than that of air or water, provide a preferential path for the magnetic field, exerting relative to it a sort of suction or 'sucking', at least in the immediate vicinity of the shield.

However, although on the one hand the shell made of ferromagnetic material is able to shield the magnetic field generated by the electric motor, on the other hand its very presence results in a similar drawback.

In effect, since the shell has a significant magnetic mass, its very presence connected to the ship results in, with the movement, continuous and significant alterations of the terrestrial magnetic field, which can be easily detected by the sensors of influence mines.

The systems normally used for the magnetic shielding of ships, known as degaussing, are, in effect, housed in of the hull of the ship and are used basically to screen the effects of alteration of the terrestrial magnetic field caused by the mass of the ship. However, these systems are not able to compensate for the alterations caused by the azimuth propulsion units which are necessarily outside of the hull, protruding from it.

DISCLOSURE OF THE INVENTION

The aim of this invention is to provide an azimuth propulsion system for ships which is able to limit the alterations of the terrestrial magnetic field.

A further aim of this invention is to provide an azimuth propulsion system for ships which is inexpensive to make and practical and efficient to use.

A further aim of this invention is to propose a method for magnetic shielding of an azimuth propulsion system for ships.

The technical features according to the above-mentioned objects may be easily inferred from the present disclosure.

BRIEF DESCRIPTION OF DRAWINGS

The advantages of the invention are more apparent from the detailed description which follows, with reference to the accompanying drawings which illustrate a preferred, non-limiting example embodiment of the invention and in which.

DETAILED DESCRIPTION OF PREFERRED EMBODIMENTS OF THE INVENTION

Figure 1:
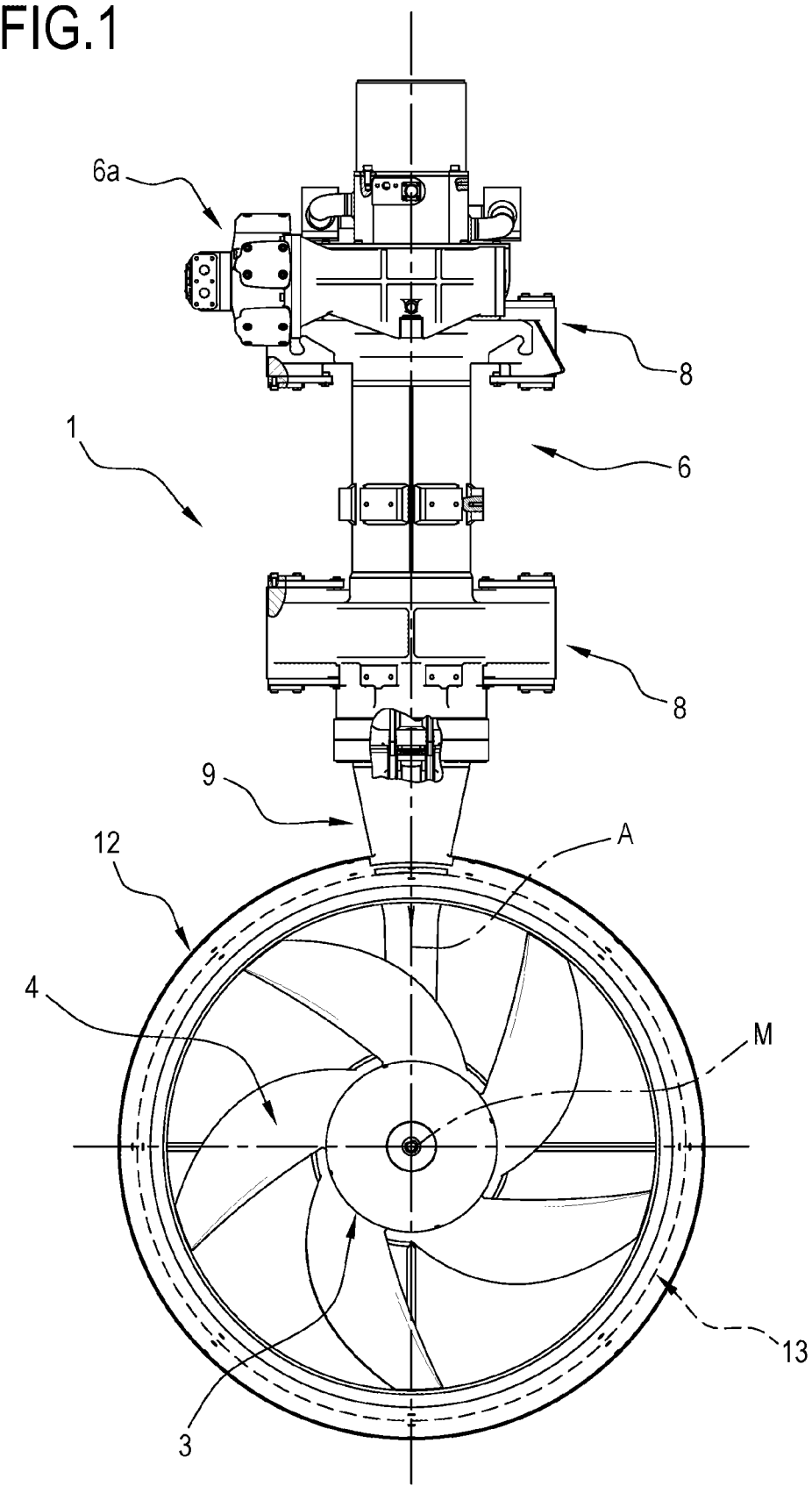
FIG. 1 is a schematic side elevation view, with some parts in cross section, of a preferred embodiment of the azimuth propulsion system for ships made according to this invention.
Figure 2:
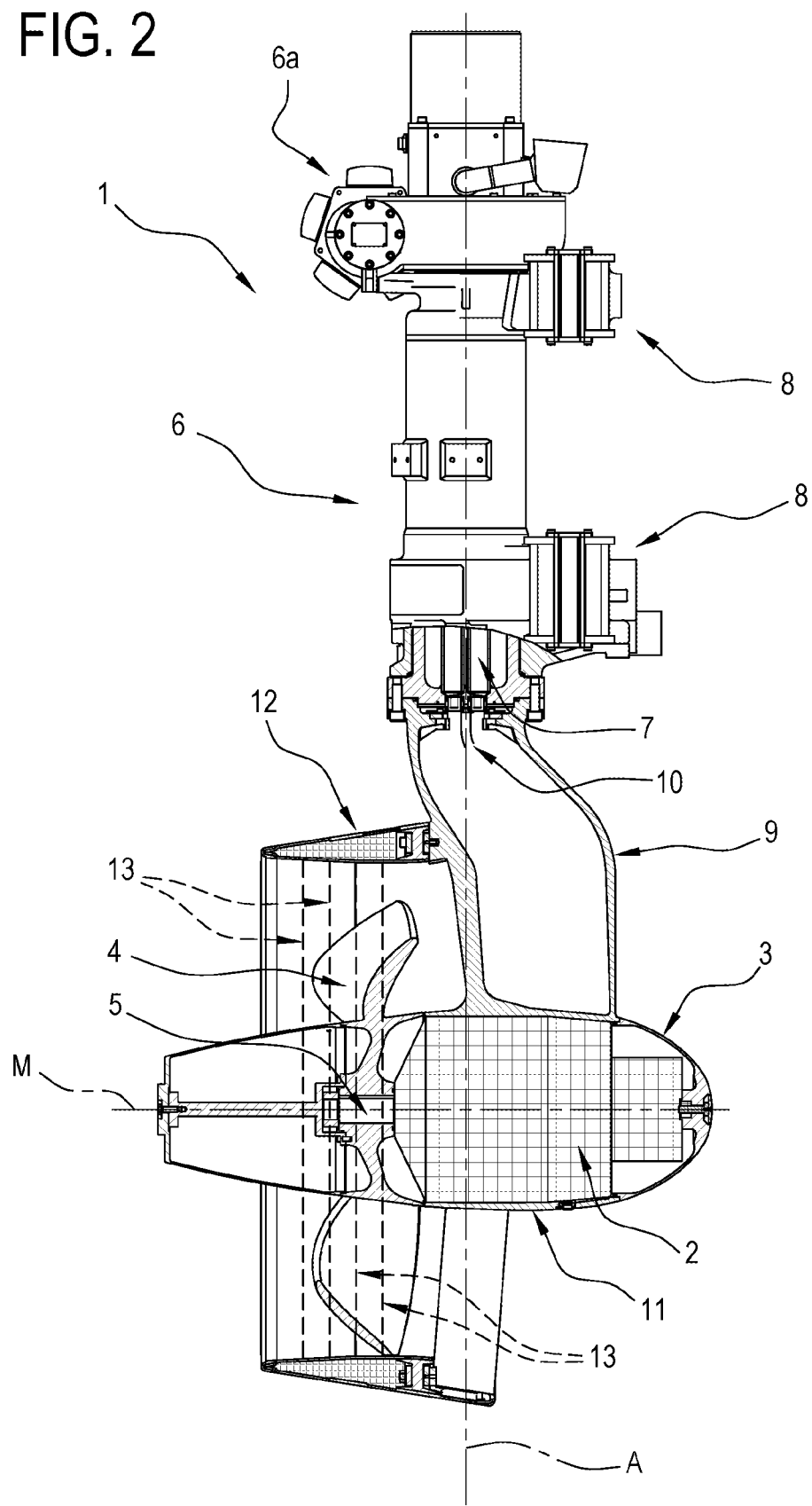
FIG. 2 is a schematic front view of the system of FIG. 1.

With reference to FIG. 1, the reference numeral 1 denotes in its entirety an azimuth propulsion system for ships made in accordance with this invention.

The system 1 comprises an electric motor 2 encapsulated inside a container 3 and a propulsion propeller 4 operatively connected to the motor 2.

The propulsion propeller 4 is designed to rotate about a relative central axis M, coinciding with the axis of rotation of the electrical motor 2.

The propeller 4 rotates about the relative axis M as one with a rotation shaft 5 of the electric motor 2.

The container 3 is preferably ogival-shaped.

The system 1 comprises elements 6 for supporting the assembly consisting of the container 3, the electric motor 2 and the propulsion propeller 4.

The supporting elements 6 support the container 3, the motor 2 and the propeller 4 in a position protruding below the hull, not illustrated, of a ship.

The supporting elements 6 are designed to allow the rotation of the motor 2 and the propeller 4 relative to a vertical axis A perpendicular to the above-mentioned central axis M of the propeller, to be able to control the ship, as is known in the azimuth propulsion systems.

The supporting elements 6 comprise a shaft 7 rotatable about the above-mentioned vertical axis A, the fixing elements 8 stable with the hull of the ship and a fin 9 designed to contribute to the steering of the ship.

At a relative upper portion 6a, the supporting elements 6 have, not illustrated in detail, mechanisms which drive the shaft 7, housed inside the hull, for rotating the shaft 7 about the axis A, according to an azimuth propulsion system.

As illustrated in the accompanying drawings, the container 3 is preferably connected to the fin 9.

The fin 9 is preferably hollow and inside it pass cables 10, visible only partly in FIG. 1, for powering the electric motor 2 and any other electrical apparatus.

The fin 9 is, as mentioned, integral with the container 3 and preferably has an aerodynamic transversal cross section.

Whether it is in the form of a single body with the container 3 or separate from it, the propulsion system 1 comprises a shell 11 made of ferromagnetic material, located in such a way as wrap around the electric motor 2, at least partly.

The shell 11 is configured to shield the magnetic field generated by the electric motor 2 during its operation to rotate the propeller 4.

The shell 11 made of ferromagnetic material thus defines, for the system 1, first magnetic shielding means.

More in detail, with reference to the electric motors 2 normally used, the first shielding element of the rotor is the same stator. The shielding effect of the stator has often proved to be insufficient and, therefore, the entire motor 2 (that is, the rotor and stator) is inserted in a suitable shell 11 which closes inside it the magnetic flux lines which escape from the stator.

The system 1 also comprises an annular nozzle 12 positioned coaxially around the propeller 4.

For hydrodynamic requirements, the nozzle 12 advantageously has, in cross-section, a wing-shaped profile, as clearly shown in FIG. 1.

A plurality of conductor turns 13 are inserted inside the nozzle 12, extending in a loop substantially coaxial with the propeller 4.

The turns 13, schematically illustrated in the accompanying drawings by dashed lines, are made of conductive metal material, such as copper or copper alloys.

The turns 13 are designed to be passed through by electric current and configured to generate respective magnetic fields.

The system 1 comprises a computerised control unit, not illustrated, provided, in a relative improved embodiment, for measuring quantities representing the terrestrial magnetic field close to the propulsion system, during navigation.

Advantageously, in this relative improved embodiment, the computerised unit comprises two magnetometers positioned spaced from each other in such a way that one, located away from the system 1, reads the terrestrial magnetic field unaltered (by the system 1) and the other, positioned close to of the propulsion system, reads the value altered by the presence of the propulsion system 1 and by its movement. The computerised unit, starting from the reading of these values, regulates the intensity of the current in the turns 13 and, by means of successive feedbacks tends to make the two readings equal, thus basically eliminating the alteration of the terrestrial magnetic field induced by the system 1.

In a simplified alternative embodiment, the computerised unit is configured to measure the instantaneous speed of the propulsion system 1 both in terms of speed of the ship and in terms of angular speed relative to the axis A. These speed values are matched with corresponding extents of the alteration of the terrestrial magnetic field, the extent being within a mapping prepared on the basis of predetermined values, in the past acquired either experimentally or by means of suitable calculations.

The computerised unit, on the basis of the extent of estimated alterations, obtained from the above-mentioned mapping, regulates the intensity of the current in the turns 13. In both the embodiments described above, the computerised unit is therefore designed to regulate, in particular in terms of intensity, the electric current flowing through the above-mentioned conductor turns 13.

As is known, an electrical turn current passed through by current generates a respective magnetic field. A plurality of electrical turns generate a magnetic field resulting from the combination of the magnetic fields of each turn.

The magnetic field generated by the turns 13, as a function of the electric current supplied to them by the above-mentioned and not illustrated computerised unit, is designed to compensate the variations of the terrestrial magnetic field generated by the movement of the system 1, and in particular of the shell 11, relative to the terrestrial magnetic field.

Reference is made in particular to the shell 11 since it is a ferromagnetic body whose magnetic field cannot be shielded by the shielding system normally integrated in the hull of a ship, due precisely to location of the shell 11 outside the hull.

The shell 11, which is integral with the hull, moves at the same speed as the hull. It should also be noted that the shell 11 is also designed to rotate about the vertical axis A. These movements create an alteration of the terrestrial magnetic field perceived by the mine.

Advantageously, the above-mentioned computerised unit is configured for independently regulating the electric current flowing in each conductor turn 13.

Alternatively, the independent regulation may relate to homogeneous groups of turns 13.

The above-mentioned computerised unit is also configured for detecting quantities representing the terrestrial magnetic field close to the propulsion system.

The above-mentioned and not illustrated computerised unit defines, for the system 1, check and control means designed to regulate the electric current flowing in the conductor turns 13.

The turns 13, together with the respective check and control means define, in their entirety, for the propulsion system 1, respective second shielding magnetic means to compensate for the variations of the terrestrial magnetic field generated by the movement of the system 1.

In use, with the adoption of the azimuth propulsion system 1 for ships according to this invention, it is possible to considerably reduce or even eliminate completely the effects of alteration of the terrestrial magnetic field induced by the movement of the propulsion system and which could potentially perceived by a mine.

Advantageously, by means of the computerised unit, the system 1 measures quantities representing the terrestrial magnetic field nearby or, alternatively, produces an estimate of the alteration caused in the terrestrial magnetic field by the movement of the system 1.

By way of an example, this estimate is based on reference values acquired by tests and simulations also in the laboratory, when values representing the terrestrial magnetic field and the respective alterations of the values following the presence of bodies 1 such as the propulsion system are reproduced. Alternatively, the reference values are obtained by suitable calculations.

In reality, what influences more the alteration is the movement of the shell 11 made of ferromagnetic material defining the first shielding means.

Once the extent and the consistency of the alteration has been acquired, the computerised unit regulates the supply of electric current to the various conductor turns 13 positioned in the nozzle 12 in such a way as to generate a magnetic field with an extent and consistency which annuls the alteration.

In other words, the magnetic field generated by the turns 13, adequately modulated, is able to shield the effects of alteration of the terrestrial magnetic field caused by the movement of the system 1 with respect to the terrestrial magnetic field.

Advantageously, the possibility of modulating or in any case adjusting the electric current circulating in each turn 13 independently from each other allows the characteristics of the magnetic field generated to be varied, making the system 1 easily adaptable to the changing conditions of alteration of the terrestrial magnetic field.

In more general terms, the ferromagnetic masses, in our case consisting basically of the shell 11 and the electric motor 2, moving in the terrestrial field generate a disturbance (magnetic induction effect). This disturbance is a function of the speed of the ship and the rotation of the propulsion system. The countermeasure adopted by means of this invention is that of having a system of turns 13 which are able to create a magnetic field, instant by instant, which is equal and opposite to the disturbance created. The invention achieves the preset aims.

Thanks to the system according to this invention it is possible to markedly reduce the magnetic signature of a ship, thereby making the ship less vulnerable at least to magnetic influence mines.

The invention claimed is:

1. A naval azimuth propulsion system comprising:
   an electric motor,
   a propeller operatively connected to the electric motor to rotate about a central axis of the motor,
   an annular nozzle positioned coaxially around the propeller,
   a supporting mount for supporting the motor and the propeller, the supporting mount including a fixed portion suitable for mounting to a hull of a ship and a shaft rotatably mounted with respect to the fixed portion for rotatably mounting the electric motor to the fixed portion,
   a first magnetic shield including a shell suitable for shielding a magnetic field generated by the electric motor during operation,
   a second magnetic shield suitable for compensating variations of a terrestrial magnetic field generated by movement of the first magnetic shield relative to the terrestrial magnetic field,
   the second magnetic shield comprising a plurality of electrical conductor turns wound on the annular nozzle, the electrical conductor turns generating a respective magnetic field when electric current flows through the electrical conductor turns,
   the second magnetic shield comprising a check and control system including a computer configured to regulate the electric current flowing through the electrical conductor turns independently of a current flowing through the electric motor and thereby regulate the respective magnetic field to compensate for the variations of the terrestrial magnetic field independently of the current flowing through the electric motor.

2. The propulsion system according to claim 1, wherein the check and control system is configured to independently regulate the electric current flowing in each of the electrical conductor turns.

3. The propulsion system according to claim 1, wherein the computer is configured for detecting quantities representing the terrestrial magnetic field close to the propulsion system.

4. The propulsion system according to claim 1, wherein the computer is configured for estimating variations in the terrestrial magnetic field close to the propulsion system.

5. The propulsion system according to claim 1, wherein the shell is made of ferromagnetic material, the shell being positioned to at least partly wrap around the electric motor.

6. A method for magnetic shielding of a naval azimuth propulsion system, comprising the steps of:
   preparing a naval azimuth propulsion system comprising an electric motor, a propeller operatively connected to the electric motor, an annular nozzle positioned coaxially around the propeller, a first magnetic shield including a shell suitable for shielding a magnetic field generated by the electric motor during operation,
   providing a plurality of electrical conductor turns wound around the annular nozzle,
   supplying electric current to the electrical conductor turns to generate a respective magnetic field suitable for compensating variations of a terrestrial magnetic field generated by movement of the first magnetic shield relative to the terrestrial magnetic field,
   regulating the electric current flowing through the electrical conductor turns independently of a current flowing through the electric motor and thereby regulating the respective magnetic field to compensate for the variations of the terrestrial magnetic field independently of the current flowing through the electric motor.

7. The shielding method according to claim 6, and further comprising a step of estimating the variations of the terrestrial magnetic field generated by the movement of the first magnetic shield relative to the terrestrial magnetic field.

8. The shielding method according to claim 6, and further comprising providing that the shell is made of ferromagnetic material, the shell being positioned to at least partly wrap around the electric motor.

\* \* \* \* \*